US005822018A

United States Patent [19]

Farmer

[11] Patent Number: 5,822,018

[45] Date of Patent: Oct. 13, 1998

[54] METHOD AND APPARATUS FOR NORMALIZING SIGNAL LEVELS IN A SIGNAL PROCESSING SYSTEM

[76] Inventor: James O. Farmer, 3602 Preston Ct., Lilburn, Ga. 30247

[21] Appl. No.: 626,733

[22] Filed: Apr. 2, 1996

[51] Int. Cl.$^6$ .................................................. H04N 7/10

[52] U.S. Cl. ................................ 348/705; 348/9; 381/108

[58] Field of Search .................................... 348/705, 678, 348/680, 687, 6, 9; 330/279, 284; 381/103, 108, 102, 106; H04N 7/18, 7/10

[56] References Cited

U.S. PATENT DOCUMENTS

| | | | |
|---|---|---|---|
| 2,969,427 | 1/1961 | See | 348/705 |
| 4,864,627 | 9/1989 | Dugan | 381/108 |
| 5,424,770 | 6/1995 | Schmelzer | 348/9 |
| 5,617,151 | 4/1997 | Lee | 348/731 |
| 5,652,615 | 7/1997 | Bryant | 348/9 |

OTHER PUBLICATIONS

Orban Corporation, Product Brochure of Model 8282 Digital Optimod, © 1994.

*Primary Examiner*—Howard Britton
*Attorney, Agent, or Firm*—Sawyer & Associates

[57] ABSTRACT

A cable television (CTV) system having an ad-insertion apparatus for automatically inserting commercial segments into program material under the control of cue tones transmitted by the program source. The system includes apparatus for normalizing the audio signal levels of the program and commercial materials so that the audio portion of the output signal being transmitted to subscribers will have a relatively uniform loudness. The same concept may be applied to video signals. Additionally, signals coming from several channels may be normalized with respect to each other using the same technique. One aspect involves normalization of the audio level of the commercial, based on measured levels of the program audio preceding the advertisement. In other variations, the program audio level is adjusted to match a preset audio level of an advertisement. In another aspect of the invention, the audio level adjustment is achieved by monitoring the deviation of an audio modulator. In general the technique comprises generating composite CTV output signals in each of a plurality of CTV channels by generating a series of program segments and cue tones indicating the borders of the program segments and a series of commercial segments in response to the cue tones. Each CTV channel output is formed by alternately linking program segments with commercial segments at the borders in response to the cue tones. The channel outputs are combined for simultaneous transmission to subscribers. The loudness of the segments in one of the CTV channels is monitored. Volume attenuators are adjusted in each of the channels as a function of the loudness in one of the channels such that the loudness of the audio in the channels is normalized.

38 Claims, 12 Drawing Sheets

METHOD AND APPARATUS FOR NORMALIZING SIGNAL LEVELS IN A SIGNAL PROCESSING SYSTEM

BACKGROUND OF THE INVENTION

1. Field of the Invention

The invention relates to signal processing systems and methods and, particularly, to techniques for normalizing signal levels in a signal processing system.

2. Description of the Prior Art

Many electronic systems configure and format signals by linking together a series of signal segments obtained from a number of different sources. In such systems, it is usually important that the signal levels at the different sources be matched. Conventional television and radio transmission systems are notable examples.

For example, subscriber television systems, such as cable television (CTV), normally deliver programs that are formed from a number of successive segments that originate at different sources. Many cable channel programmers set aside approximately four minutes in two blocks each hour for local advertising insertion. These advertisement blocks are sold by the local cable operator or by an advertising consortium of several cable systems. The cable operator automatically inserts the advertising in, for example, a satellite-delivered program coming from the programmer. The insertion is usually done locally under the control of cue tones transmitted by the programmer. At these specific cues, the cable operator switches different audio and/or video programming. Consequently, cable operators frequently encounter the problem of matching the audio and/or video levels between the different sources. This problem is particularly acute in CTV systems where the system performs automatic switching with no human operator to adjust levels.

In many prior art CTV systems, ad-insertion is handled by a combination of cue tone detectors, switching equipment and tape players which hold the advertising material. Upon receipt of the cue tones, a CTV insertion controller automatically turns on a tape player containing the advertisement. Switching equipment then switches the system output from the video and audio signals received from the programming source to the output of the tape player. The tape player remains on for the duration of the advertising, after which the insertion controller causes the switching equipment to switch back to the video and audio channels of the programming source. When switched, these successive program and advertising segments usually feed to a radio-frequency (RF) modulator for delivery to the subscribers.

Many subscriber television systems, such as CTV systems, are currently being converted to digital equipment. In the future, video file-server systems will replace many of the conventional tape players. These new digital systems compress the advertising data, e.g., using Motion Picture Experts Group 2 (MPEG2) compression, store the compressed data as a digital file on a large disk drive (or several drives), and then, upon receipt of the cue tone, spool ("play") the file off the drive to a decompressor. The video and accompanying audio data are decompressed back to standard video and audio, and switched into the video/audio feed of the RF modulator for delivery to the subscribers.

One of the most critical problems confronting designers of CTV systems and other similar transmission systems, has been normalizing the audio and video levels between the programming and the advertising. It is generally known that many subscribers have complained for years that the audio sounds higher during commercials than during programming. Although the audio during commercials can also sound low compared to the program level, few people complain in that case.

Consequently, those concerned with the development of radio, television, data, control and equivalent transmission systems have recognized the need for more effective signal-level normalization techniques. The present invention fulfills this need.

SUMMARY OF THE INVENTION

Therefore, it is an object of the invention to provide an improved signal-level normalization technique for use in signal transmissions such as audio, video and data transmissions.

It is another object of the invention to provide a signal-level normalization technique particularly suitable for use in digital networks.

A further object of the invention is the provision of systems and methods of normalizing the signal level in a first signal block, such as the audio and/or video levels in a television program or a commercial, based on comparable measured levels of a second signal block, such as a prior program or a preceding commercial.

Still another object of the invention is the provision of systems and methods of normalizing the signal level in a signal block based on previously measured levels of the signal block.

Yet a further object of the present invention is the provision of a signal insertion technique capable of performing quality checks, such as verifying that the proper commercial was inserted into a predetermined location in the advertising block of a program.

According to the invention, a signal processing system having a normalized output signal comprises a first signal source and a second signal source. A signal combiner connects to the first and second signal sources for forming an output signal by linking signal segments derived from the first and second signal sources into a series of the signal segments. A level processor connects to the signal combiner for determining a level of intensity of the output signal. A level adjuster connects to at least one of the signal sources and responds to the level processor for adjusting a level of intensity of the signal segments at least one of the signal sources such that the level of intensity of the output signal is normalized.

More specifically, the invention provides a signal transmission system for producing a composite output signal formed by linking signals from a plurality of signal sources comprising a first signal source for generating a series of first segments and cue tones indicating the borders of the first signal segments, and a second signal source connected to the first signal source. Responsive to the cue tones, the second signal source generates a series of second signal segments. The first and second signal segments include audio signals. A signal combiner is connected to the first and second signal sources for forming the composite output signal by alternately linking the first signal segments with the second signal segments. A level processor connects to the signal combiner for determining the loudness of the audio portion of the composite output signal. A level adjuster connects to at least one of the signal sources and responds to the level processor for adjusting the loudness of signal segments from the signal sources such that the volume of the output signal is normalized.

Still another aspect of the invention involves a signal transmission method for transmitting an output signal by generating composite output signals in each of a plurality of signal channels. The composite output signals in each channel is formed by generating a series of first signal segments and cue tones indicating the borders of the first signal segments, and generating a series of second signal segments in response to the cue tones. Each channel output is formed by alternately linking the first signal segments with the second signal segments at the borders in response to the cues tones. The channel outputs from each channel are combined for simultaneous transmission to users. The method includes the step of determining a level of intensity of signals in a first channel output and adjusting a level of intensity of each of the channel outputs as a function of the intensity in the first channel output such that the levels of intensity of the channel outputs are normalized.

These and other objects, features and aspects of the invention will be more clearly understood and better described if the following detailed description is read in conjunction with the appended drawings wherein:

DETAILED DESCRIPTION OF THE PREFERRED EMBODIMENTS

Figure 1:
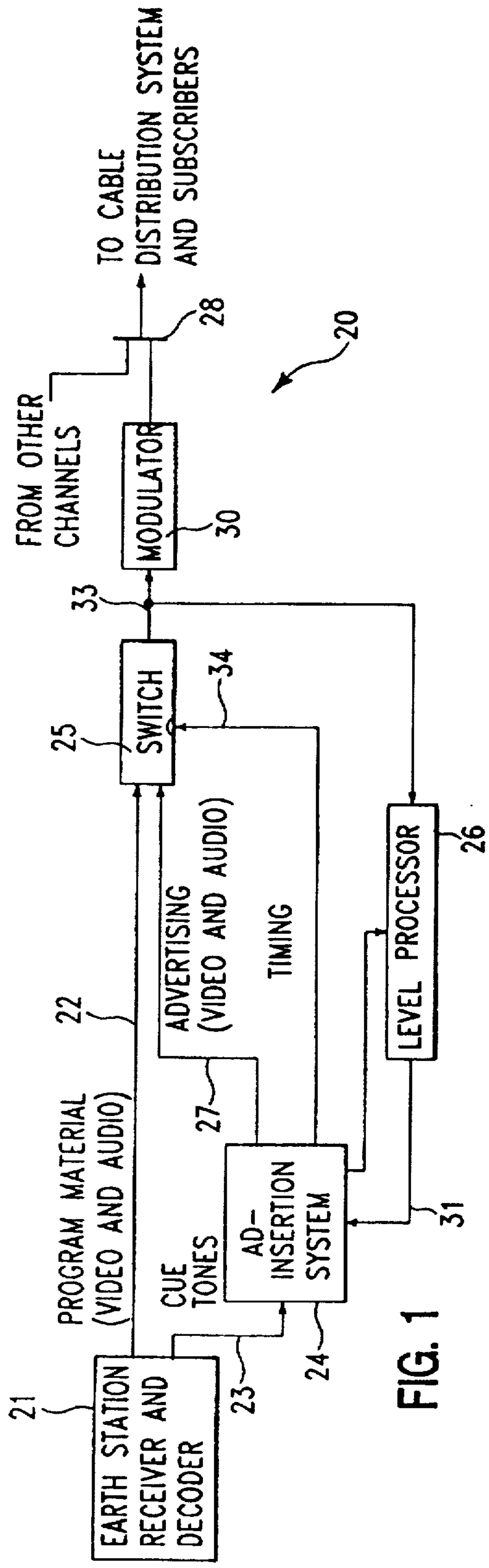
FIG. 1 is a system block diagram of a cable television head-end system constructed in accordance with a preferred embodiment of the invention.

Referring now to the drawings, FIG. 1 shows a general block diagram of CTV system 20. It is to be understood that the particular CTV systems described herein are exemplary and that the invention has application in other equivalent audio, video, data and other equivalent transmission systems. CTV system 20 includes earth station receiver 21 which provides decoded program material, both video and audio, at its output lines 22. Earth station receiver 21 comprises conventional receiver and decoder equipment. A typical receiver 21 normally outputs analog video (e.g., in the National Television System Committee (NTSC) format), plus one to three channels of audio. The audio channels are most commonly left- and right-channel stereo and possibly a third monaural channel for a second audio program (SAP), often in another language. Many cable operators contemplate replacing these analog systems with more modern digital CTV systems that output digital video and/or audio signals from receiver 21.

In addition to the video and audio channels, receiver 21 transmits cue tones on line 23 to ad-insertion system 24 which uses the cue tones to generate timing signals for controlling the insertion of advertising into the program material. In most systems, the cue tones are a series of dual-tone multiple-frequency (DTMF) tones which identify the programmer and the insertion times in the ad-insertion process. Typically, different cues are transmitted for pre-roll (an advance in time to allow a tape machine to get up to speed), transfer-to-ad (a time at the beginning of the advertisement block) and return (the conclusion of the advertisement block).

Timing signals, which ad-insertion system 24 outputs onto lines 34, operate transmission switch 25. Ad-insertion system 24 generates these timing signals in response to the cue tones received on line 23. When operated, switch 25 routes either the program audio and video, which appear on lines 22, or the advertising video and audio, which appear on lines 27, to modulator 30 via lines 33. Modulator 30 modulates the video and audio onto an RF carrier that it transmits to subscribers along with all other channels via combiner 28. Modulator 30 will often include other equipment that receives and processes the signals, such as scramblers and stereo encoders or the like.

Consequently, in response to appropriate cue tones on line 23, ad-insertion system 24 automatically inserts commercials into advertising blocks by spooling advertising material onto lines 27 and, hence, modulator 30 via switch 25 and lines 33. To provide normalization between the audio and/or video levels of the commercials with that of the program, level processor circuit 26 monitors the signals being switched onto lines 33. Level processor circuit 26 adjusts, via lines 31, the appropriate signal levels of the advertising material being outputted by ad-insertion system 24.

As described above, a primary problem addressed by this invention involves correcting a possible mismatch between the audio level coming from receiver 21 and that coming from ad-insertion system 24. Each apparatus represents a source of audio that is prepared at a different location by different people using different equipment. While efforts have been made in the past to normalize the audio levels from these different sources, limited success has been achieved.

Typically, a level adjustment device resides within ad-insertion system 24 to allow operating personnel to manually or electronically correct for gain variations in the equipment. These level adjustment devices are often a source of possible errors due to frequent miss-adjustments. Still further, the gain of various pieces of system equipment will often shift with time and temperature.

Yet another problem in the CTV industry is that the level coming from receiver 21 may be inconsistent from one channel to another. While most receivers and decoders used in the industry have fixed output levels for a fixed input at the uplink, different programmers operate uplinks with differing input levels. This is partially because different types of program material require different amounts of headroom, and different uplink engineers have different philosophies about the amount of headroom to allow. Because of this, level adjustments in ad-insertion system 24 have become necessary.

Figure 2:
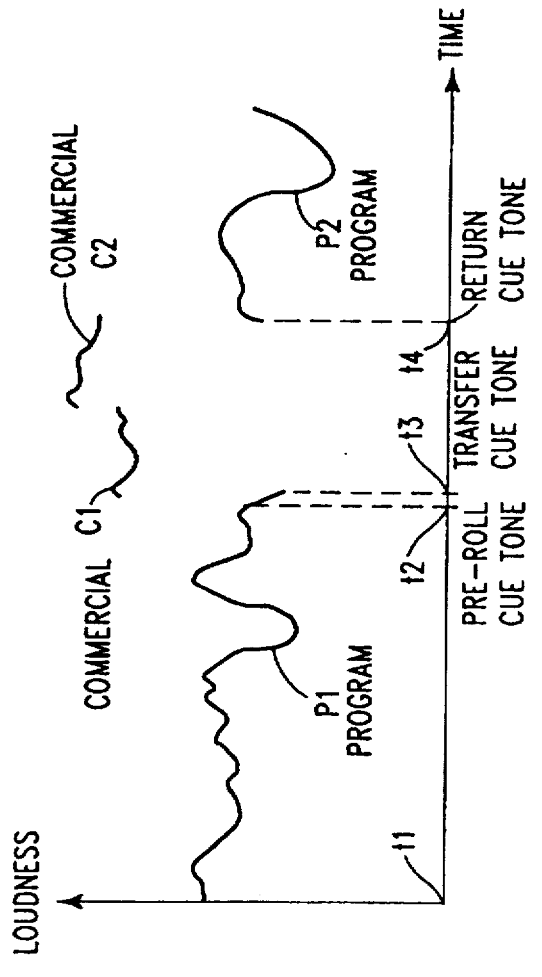
FIG. 2 is a graph of loudness of an audio signal on a logarithmic scale vs. time, which is useful in understanding the preferred embodiment of FIG. 1.

FIG. 2, which plots loudness vs. time, illustrates the problem graphically. This graph shows the relative audio levels of four consecutive segments consisting of two program segments P1 and P2, and an advertising block with two commercials C1 and C2 located therebetween. Program segments P1 and P2 and commercials C1 and C2 have their audio levels varying over time. The first program segment P1 extends between times t1 and t3. An advertising block, starting with commercial C1, follows program segment P1. The graph shows commercial C1 having a higher loudness than did the preceding program segment P1. Next in the advertising block is second commercial C2. Because it was recorded differently than was first commercial C1, the graph shows it playing louder than commercial C1. The successive commercials C1 and C2 extend between times t3 and t4. Finally, second program segment P2 follows second commercial C2, and plays at the lower loudness level of program segment P1.

The variations in loudness illustrated in FIG. 2 usually produce the irritating phenomenon sometimes called "blasting" out the commercial. As mentioned above, broadcasters and cable operators have been accused of doing this intentionally to gain listener attention for the commercials. However, usually the source of the problem is more mundane: either the commercial automatically plays and no one is available to correct the audio level, or metering problems make an objective comparison of the levels difficult.

FIG. 2 also shows the transmission times of the cue tones. The pre-roll cue tone arrives at time t2, which is usually about five to eight seconds before the commercial starts at time t3, to allow tape equipment to get up to speed before being played at time t3. A transfer cue tone arrives at time t3 to insert first and second commercials C1 and C2 into the advertising block. Finally, a return cue tone arrives at the end of the commercial break, time t4, to instruct the system to return to the program material supplied from receiver 21.

Figure 3:
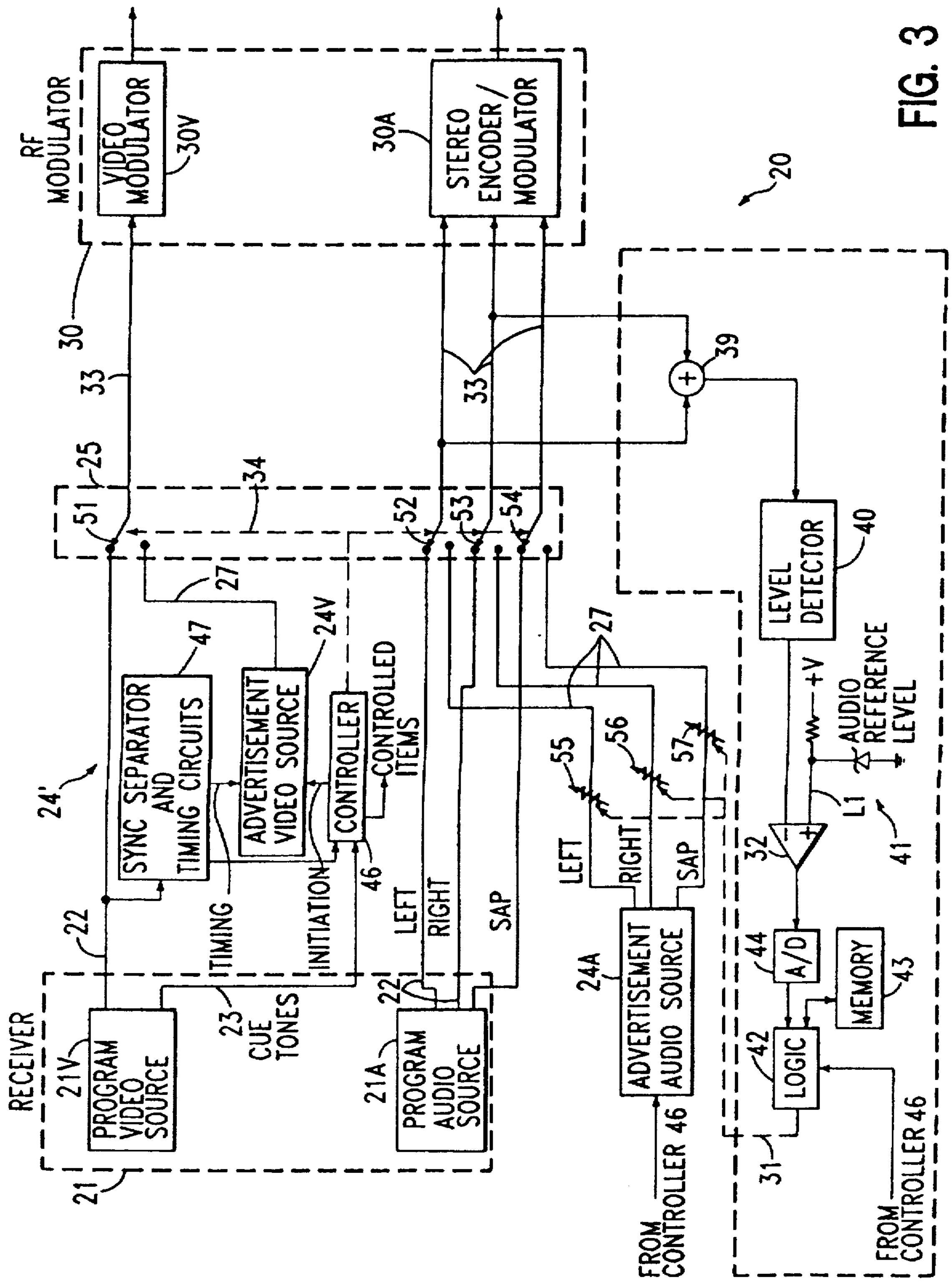
FIG. 3 is a detailed block diagram of a cable television head-end system constructed in accordance with the preferred embodiment of FIG. 1.

Referring now to FIGS. 1–4, a normalization technique in which the advertisement audio level is adjusted to match the level of the program audio will be described in detail. FIG. 3 depicts receiver 21 as having two channels, namely program video source 21V and program audio source 21A. Modulator 30 includes video modulator 30V and stereo encoder modulator 30A. FIG. 3 shows ad-insertion system 24 of FIG. 1 as having audio and video channels designated as advertisement video source 24V and advertisement audio source 24A.

FIG. 3 schematically depicts switch 25 as comprising a plurality of ganged switches, namely video switch 51 and audio switches 52, 53 and 54, being suitably switched by signals on lines 34. One input side of video switch 51 connects to program video source 21V. The other input side of video switch 51 connects to advertisement video source 24V. The output side of video switch 51 connects to video modulator 30V.

One input side of each of audio switches 52–54 connects to respective left, right and SAP channels of program audio source 21A. The other input sides of audio switches 52–54 connect to the respective left, right and SAP channels of advertisement audio source 24A via respective attenuators 55, 56 and 57 which function as audio level controls. The output sides of audio switches 52–54 connect to stereo encoder modulator 30A.

The output sides of audio switches 52 and 53 also connect to adder 39 of level processor circuit 26 via lines 33. Because the preferred manner of evaluating the level of a stereo signal is to evaluate the sum of its left and right channels, adder 39 sums these stereo signals. Level detector 40 receives the summed output of adder 39 and inputs the inverting (−) side of comparison amplifier 32. Level detector 40 receives the audio signals at its input, and outputs a voltage corresponding to the loudness. The setting of switch 25 will determine which audio signals adder 39 sums. With respect to the graph of FIG. 2, the output of level detector 40 will be a voltage that varies, preferably as a decibel (dB) function, in accordance with the four curves representing the loudness of program segments P1 and P2 and commercials C1 and C2.

Audio reference level circuit 41, represented by a Zener-diode voltage source, provides a fixed reference level L1 at the (+) input to comparison amplifier 32. Thus, comparison amplifier 32 outputs the difference between the actual volume level of the audio source, as detected by level detector 40, and the reference volume level L1 which has been preset in reference level circuit 41. Analog-to-digital (A/D) converter 44 samples the output of comparison amplifier 32. Consequently, A/D converter 44 outputs these sampled differences to logic 42 as a series of digital words proportional to a dB audio level. Logic 42 communicates with a memory 43. As will be described below in detail, logic 42, which monitors the output of A/D converter 44, adjusts attenuators 55–57 via attenuator control lines 31 in accordance with error values calculated by logic 42. To perform its level adjusting functions, logic 42 derives control and timing signals from insertion controller 46, which is a conventional part of ad-insertion system 24.

In response to the cue tones transmitted from program video source 21V on line 23, insertion controller 46 operates transmission switch 25 and sends control signals to logic 42, video source 24V and audio source 24A. Further, insertion controller 46 secures appropriate synchronization (sync) pulses and timing signals from sync separator and timing circuit 47, which is also a part of conventional ad-insertion system 24. Advertisement video source 24V uses the output of circuit 47 to synchronize its video with program video source 21V. Additionally, insertion controller 46 acquires appropriate timing signals from timing circuit 47 so that it can initiate spooling of the commercial when the appropriate pre-roll cue tone on line 23 is received, for example, at time t2 of FIG. 2. Still further, insertion controller 46 operates transmission switch 25, via switch control lines 34, in accordance with the appropriate cue tones transmitted on line 23.

It is noted that the SAP channel, if supplied, is controlled separately, based on its own characteristics. However, in the interest of clarity, this description and the related drawings omit the details of the SAP controls. However, it will be readily understood by those skilled in these arts that the SAP channel, and any other audio or data channels, may be treated in a similar manner as are the left and/or right stereo channels described herein.

Figure 4:
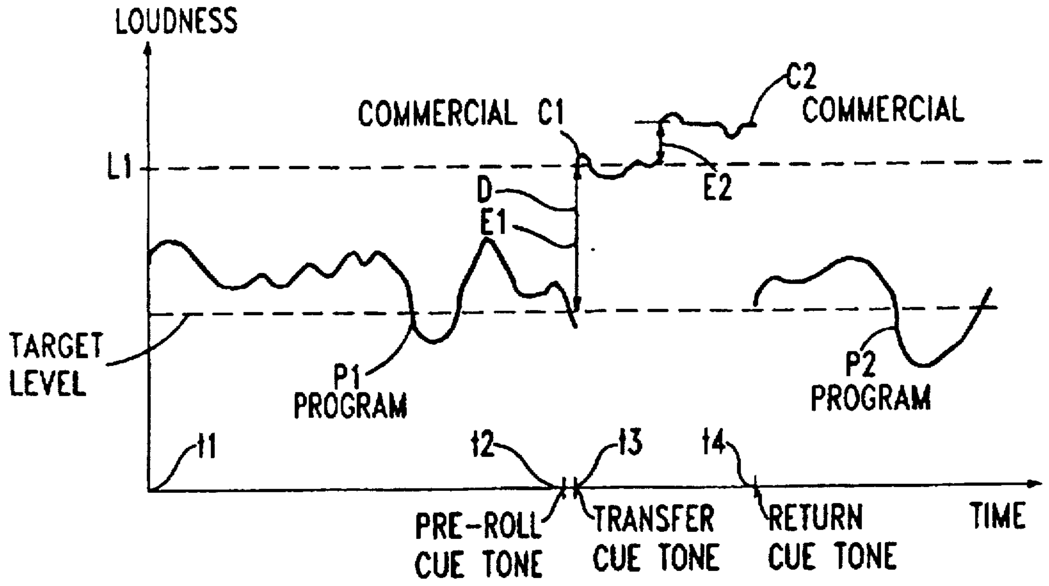
FIG. 4 is a graph, similar to that of FIG. 2, showing loudness of an audio signal on a logarithmic scale vs. time, which is useful in understanding the preferred embodiment of FIGS. 1 and 3.

The operation of CTV system 20 will now be described with reference to the circuit of FIG. 3, the sample curves depicted in FIG. 4 and the FIG. 5A flow chart. As seen in FIG. 4, the audio level over any length of time is not constant; typical program audio may range from a whisper to the loud screech of an airplane taking off. Thus, it is necessary to be precise as to what is meant by the "level" of a program. For the present description, one preferred strategy is to match the last few seconds of the program audio level (right end of program segment P1) with the first few seconds of the following commercial (left end of commercial C1). Logic 42 performs this function by keeping a running log in memory 43 of "level" measurements based on an average of the last portion of the program material. At the time the program plays, this average becomes the "target level" to which the commercial audio level is matched.

More specifically, upon start up of CTV system 20, logic 42 proceeds to monitor the output of A/D converter 44 in monitor STEP 70 (see FIG. 5A) and continues to do so until the system is turned off. During the playing of program segment P1, transmission switch 25 is in its normally up position shown in FIG. 3. As such, adder 39 will sum the left and right channels of program audio source 21A for program segment P1. Consequently, the output of comparison amplifier 32 will vary with the dB difference between program segment P1 and fixed reference level L1.

Upon receiving the pre-roll cue tone at time t2, insertion controller 46 transmits a pre-roll trigger to logic 42 in trigger STEP 71, thereby causing it to store in memory 43 a series of output values from A/D converter 44 as indicated by store STEP 71. Logic 42 next receives, in trigger STEP 73, a transfer trigger from controller 46 at time t3. At this point, logic 42 uses the series of previously stored values, in calculate STEP 74, to calculate and store the average output of A/D converter 44 between times t2 and t3. This average represents the average difference D between program segment P1 and reference level L1 for the period t2-t3 (see the FIG. 4 graph). Using this average difference D and reference level L1, in calculate and store STEP 75, logic 42 calculates a target level and stores that value in memory 43.

It is noted that many conventional ad-insertion equipment know within a minute or two when a commercial is to be inserted, i.e., when to expect to receive a pre-roll cue tone. Because of this, the program segments may be monitored and averaged over a time period other than period t2-t3, which usually lasts only five to eight seconds. For example, the average difference D may be determined over a one or two minute period just prior to the advertisement block.

As discussed above, at time t2 insertion controller 46 triggers advertisement video source 24V and audio source 24A to initiate the advertising process, i.e., to turn on the tape player to get it up to speed or, in the case of a digital system, to retrieve digital data from the appropriate file servers. Further upon receiving the transfer cue tone at time t3, insertion controller 46 switches transmission switch 25, via lines 34, to the down position as viewed in FIG. 3. At this point, the advertisement video and audio channels are switched onto output lines 33 of switch 25 for transmission to the subscribers. As such, adder 39 now monitors and adds the left and right channels of advertisement audio source 24A.

In calculate STEP 76, logic 42 calculates audio level errors En based on the current value of the target level and the output sample at the start of a commercial. For example, immediately after insertion controller 46 transmits transfer trigger, i.e., at time t3+, logic 42 calculates error E1 as the difference between the loudness level at the start of commercial C1 and the target level. Logic 42 next performs adjust STEP 77 by applying the current audio level error E1, via lines 31, to adjust the preset attenuators 55 and 56 in a direction that will cause the audio level of commercial C1 to move down to the target level.

In practice, reference level L1 represents the expected level for all advertisements and is normally obtained by recording (compressing) all commercials at a nominally identical audio level equal to level L1. FIG. 4 shows the average difference D and the audio level error E1 to be substantially equal, which illustrates the typical situation where commercial C1 was actually recorded at the nominal or expected level L1. On the other hand, FIG. 4 also shows commercial C2 as having been recorded slightly higher than the nominal or expected level L1.

Thus, if the audio sequence of program segment P1 just prior to commercial time transmits louder than the expected or nominal level L1, the level of commercial C1 will be increased by adjusting attenuators 55 and 56. On the other hand, if the audio level of program segment P1 is lower than the expected level L1, as depicted in FIG. 4, logic 42 adjusts attenuators 55 and 56 to reduce the level of commercial C1 down to the target level.

Ideally this would be the end of the process. However, as a practical matter, it is not reasonable to expect that all commercials will be recorded at the "right" level. The commercials will be recorded at different times by different individuals using different indicating instruments, using different audio processing systems, and applying different ideas of how to interpret the audio level. Thus, the level of all commercials will usually not be the same. This is illustrated in FIG. 4 by the difference between the levels of commercials C1 and C2.

Logic 42 continues to monitor the output of controller 46, waiting for the next trigger signal. In the absence of a return cue tone, insertion controller 46 signals advertisement video source 24V and audio source 24A to start playing commercial C2 at the end of commercial C1. At this time, controller 46 transmits a next-commercial trigger to logic 42 which exits the NO path of decision STEP 78 and proceeds to trigger STEP 79. In response to receiving the next-commercial trigger, logic 42 increments index n, in index STEP 80, and the process returns to calculate STEP 76. In calculate STEP 76, logic 42 calculates the new audio level error E2, which represents the small additional amount that attenuators 55 and 56 must be adjusted, in adjust STEP 77, to move the level of commercial C2 down to the target level.

When controller 46 receives a return cue from program video source 21V at time t4, it switches transmission switch 25 back to the normally up position of FIG. 3, thereby disconnecting advertisement video source 24V, and audio source 24A and reconnecting program video source 21V and audio source 21A to modulator 30. Controller 46 also transmits return trigger to logic 42. In response, logic 42 exits decision STEP 78 on the YES path and returns the process back to monitor STEP 70.

Figure 5A:
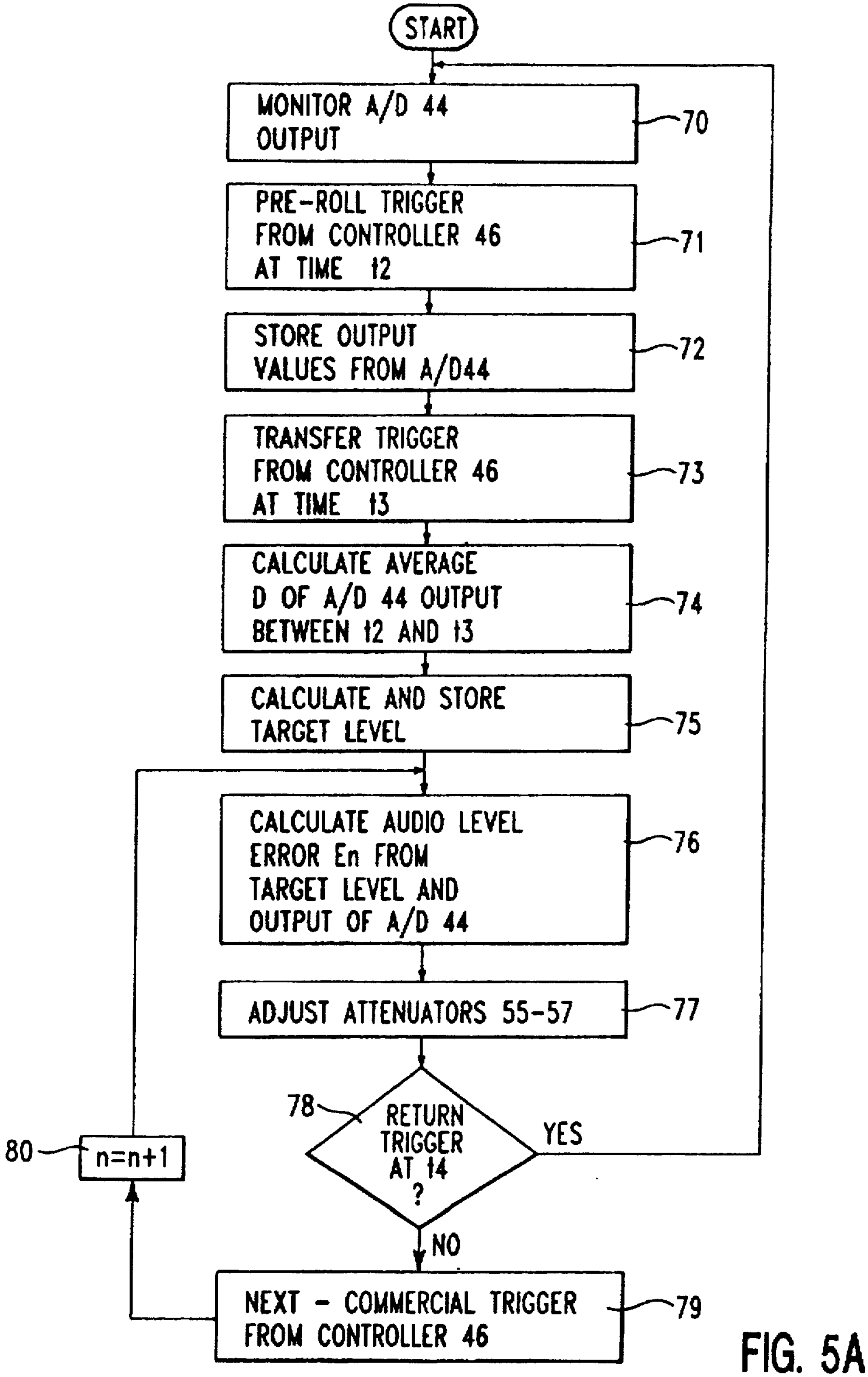
FIG. 5A is a flow chart illustrating process steps performed by the preferred embodiment of FIGS. 1 and 3.
Figure 5B:
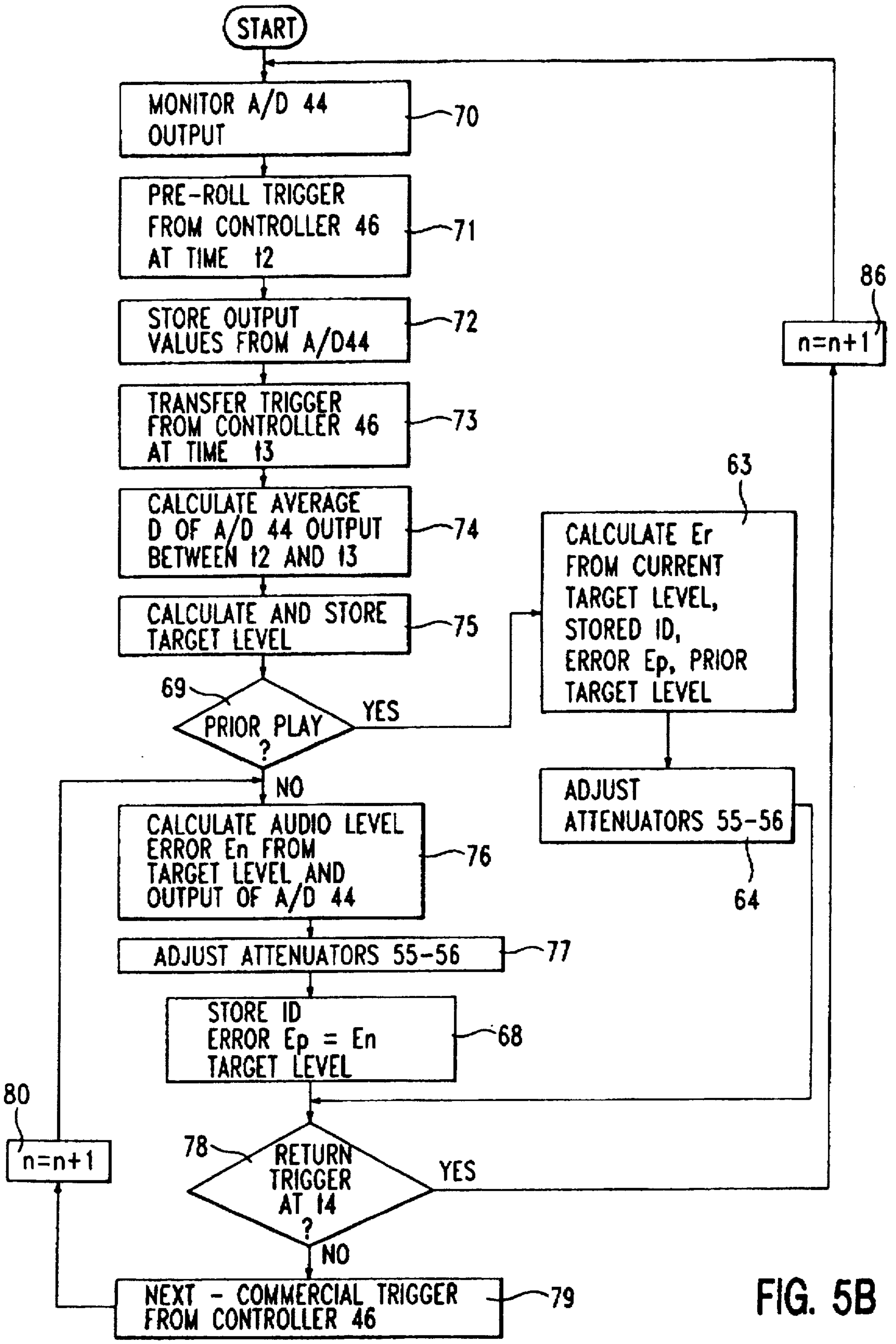
FIG. 5B is a flow chart, similar to that of FIG. 5A, illustrating alternate process steps performed by the preferred embodiment of FIGS. 1 and 3.

FIG. 5B, which is similar to FIG. 5A, depicts a modified normalization process in which the audio level offset of each commercial is stored on its first playing so that upon subsequent playing, the volume correction of that commercial may be set to an approximately correct value without the need to play, monitor and measure the commercial's level. In performing the FIG. 5B process on the program-commercial sequence of FIG. 4, logic 42 performs STEPS 70–75 to obtain the target level. At this point, logic 42 determines, in decision STEP 69, if the commercial about to be played, e.g. commercial C1, has been previously played. To do this, logic 42 looks up table entries in memory 43 that have been previously stored, listing commercial identification (ID) data, corresponding audio level errors Ep and its related target level. Controller 46 provides logic 42 with the appropriate ID data. If this is the first playing of commercial C1, the process exits STEP 69 along the NO path to calculate error E1, in calculate STEP 76, and proceeds to adjust STEP 77 to adjust attenuators 55 and 56. Next, logic 42 stores, in store STEP 68, appropriate table entries in memory 43, namely, the ID data for commercial C1, the corresponding error Ep equal to the current error E1 and its related target level. If logic 42 receives a return trigger in decision STEP 78, it exits the YES path and returns to monitor STEP 70 via index STEP 86 which increments index n. However, if logic 42 should receive a next-commercial trigger in trigger STEP 79, the process returns to decision STEP 69, via index STEP 80 which increments index n, and the process repeats for commercial C2.

However, if the commercial to be played has played previously, the process exits the YES path from decision STEP 69. Logic 42 uses the commercial's ID data to accesses the appropriate table entry in memory 43. In calculate STEP 63, logic 42 calculates error Er using the current target level, error Ep, and its related target level. Logic 42, in adjust STEP 64, next adjusts attenuators 55 and 56 using audio level error Er. The process then moves to decision STEP 78 and proceeds further in the manner described above.

Pre-correcting the loudness setting for the commercials, as just described with respect to FIG. 5B, requires that tables be constructed for all commercials in the system. Since insertion controller 46 usually provides all commercials with ID data uniquely associated with that commercial, logic 42 can readily organize the table using that ID data. In the preferred embodiment, the table is duplicated for each channel on which the commercial airs. This will accommodate any differences in the gain of comparison amplifier 32 or other errors from channel to channel.

Figure 13:
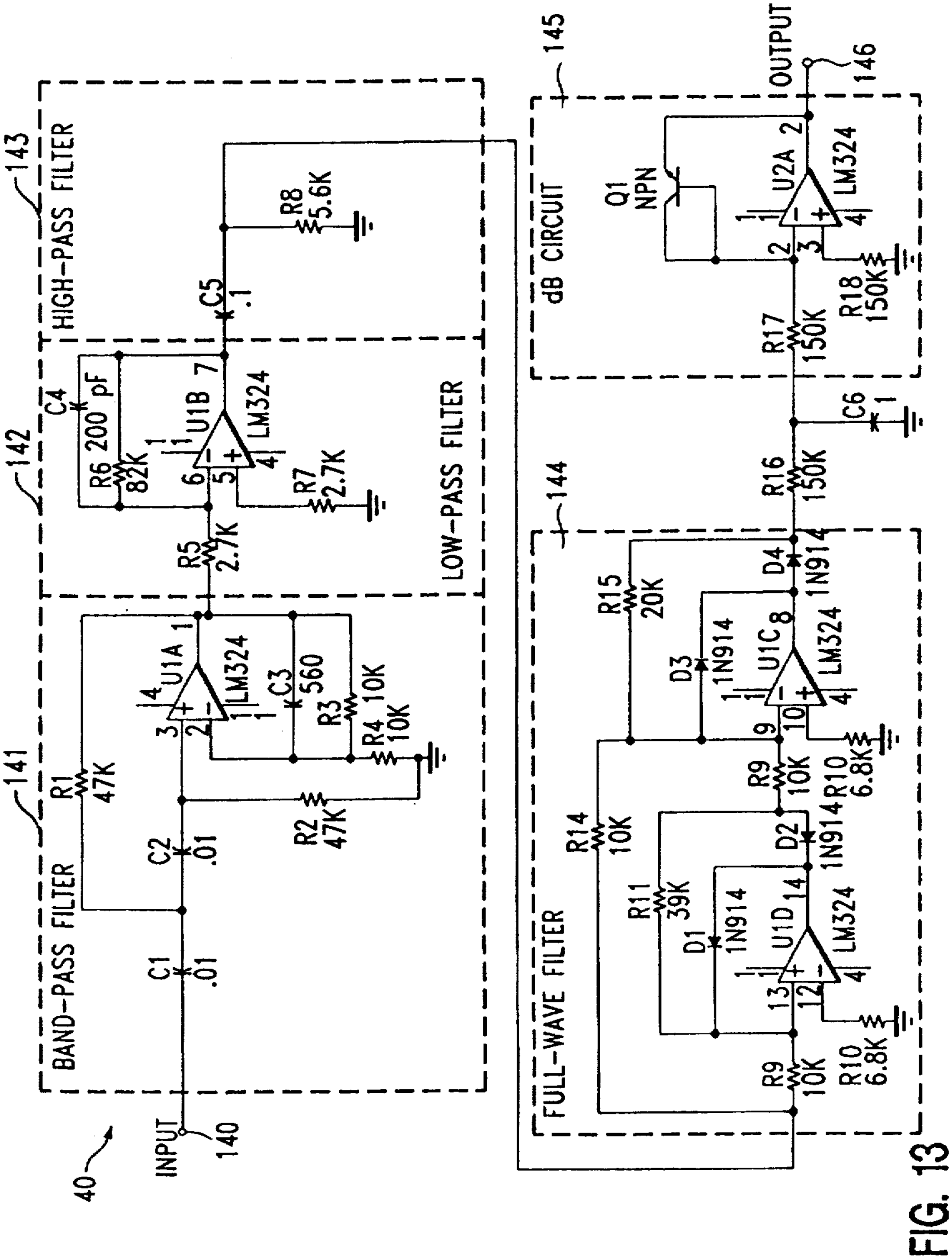
FIG. 13 is a detailed circuit schematic with parameter values for the various elements thereof, representing a particular implementation of a level detector that forms a part of the various preferred embodiments of the present invention.

Many other modifications and variations are possible in the light of the above teachings. For example, in order to allow the above-described level setting activities to proceed without undue computational stress being required of logic 42, level detector 40 is preferably configured to output the measured level differences in decibels (dB), a well-known operation which converts ratio (division) operations into addition. Those skilled in these arts can readily design the output voltage of level detector 40 to be proportional to the dB level of the audio differences. FIG. 13, to be described below in detail, includes a specific implementation of level detector 40 with a dB output. Attenuators 55–57, therefore, attenuate the audio signals in a conventional dB relationship with respect to errors En. Although the conversion to dB representation may be performed intrinsically in level detector 40, as depicted herein, it is possible and often preferable to take the functions of audio reference level circuit 41 and comparison amplifier 32 into the digital domain by digitizing the output of level detector 40.

A source of error in the audio level output to the subscribers occurs when the input sources at receiver 21 change from time to time. Such will be the case, for example, when a channel is shared during different times. During the day the channel might be used for educational programming and during the evening the channel might be used for pay programming. This necessitates the switching of inputs to the receiver channel. If the audio levels from the two different sources are different, which is the rule rather than the exception, CTV system 20', an alternate embodiment, normalizes these differences.

Figure 6:
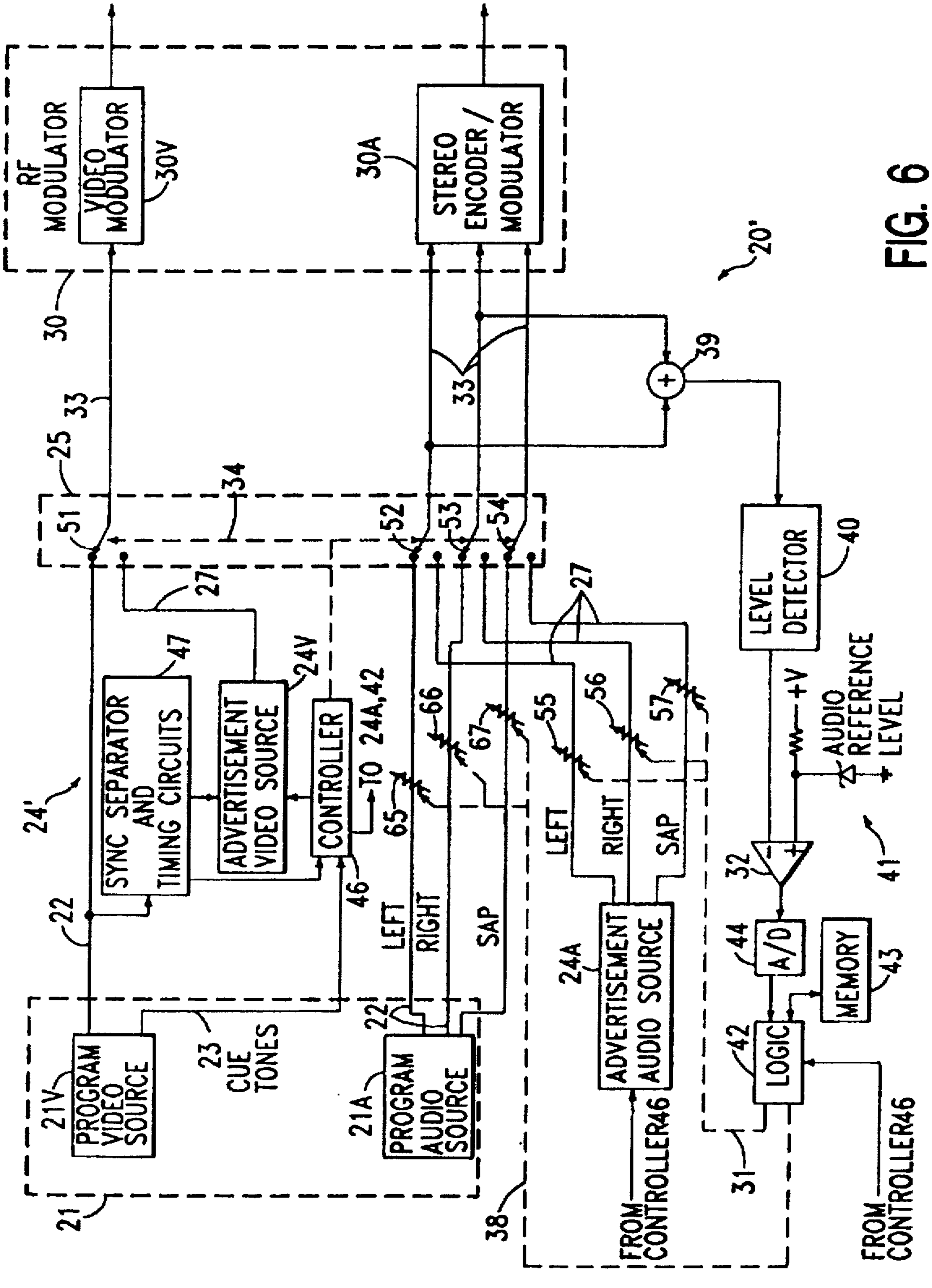
FIG. 6 is a detailed block diagram, similar to that of FIG. 3, of an alternate embodiment of the invention.

FIG. 6 illustrates CTV system 20' which monitors the level of a program segment, e.g. program segment P1, and adjusts its level to match the nominal commercial reference level L1. Additionally, the commercials have their levels corrected, if necessary, as they begin to play. The advantage of this embodiment is that, if a program level changes as a result of uplink errors or system gain changes, the level correction subsystem automatically corrects the match for these errors and/or changes.

In addition to the elements that make up CTV system 20, CTV system 20' has three attenuators 65–67 in the program audio path. More specifically, CTV system 20' shows attenuators 65, 66 and 67 connected in the respective left, right and SAP channels of program audio source 21A. Attenuator control lines 38 connect logic 42 to the control terminals of program attenuators 65, 66 and 67. By adding program attenuators 65–67, CTV system 20' functions to normalize errors in the program audio levels. As such, CTV system 20' automatically normalizes unwanted variations in program levels that may be caused by, for example, inconsistent adjustments made by those who operate CTV head-ends, or audio gain variations in the head-end that change with time or temperature.

Figure 7:
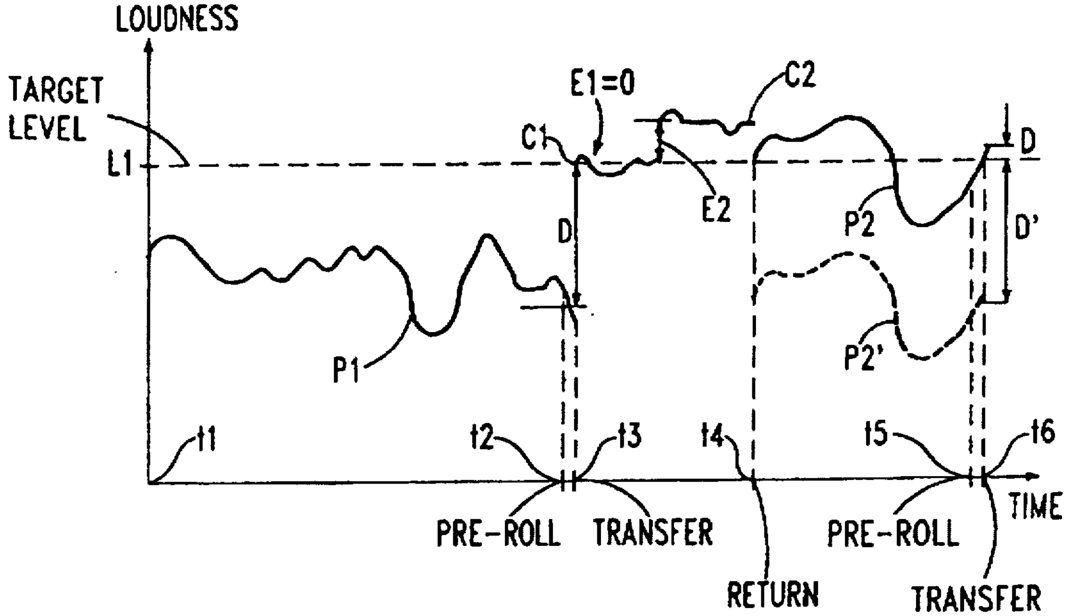
FIG. 7 is a graph, similar to that of FIG. 4, showing loudness of an audio signal on a logarithmic scale vs. time, which is useful in understanding the embodiment of FIG. 6.
Figure 8:
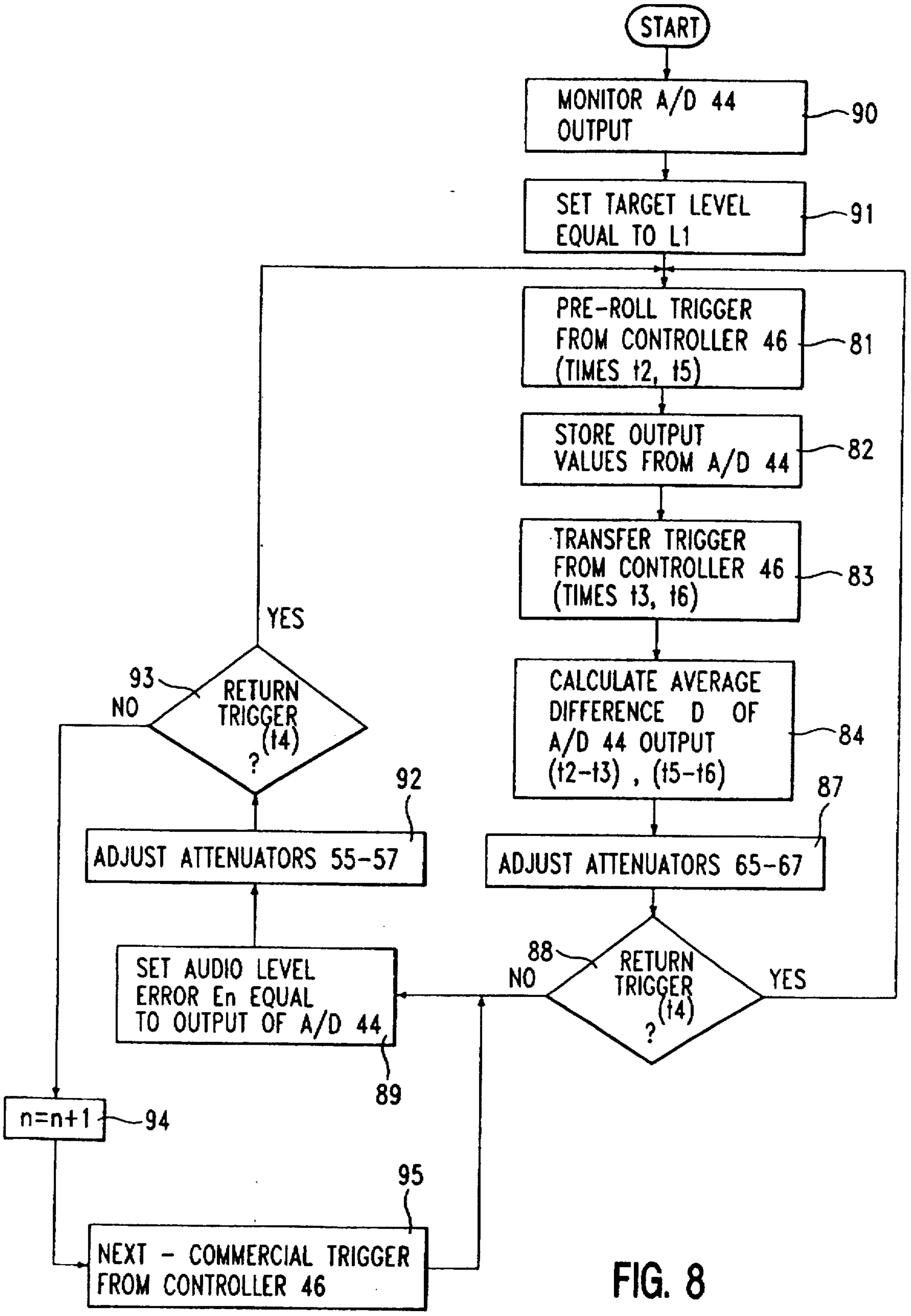
FIG. 8 is a flow chart illustrating process steps performed by the embodiment of FIG. 6.

The audio level normalizing technique of CTV system 20' parallels that of CTV system 20, except that system 20' contains enough controls to allow the audio of program segments P1 and P2, and the audio of commercials C1 and C2 to be set to reference level L1. This process will now be described with reference to FIG. 6, the curves in FIG. 7 and the FIG. 8 flow chart. At the start, monitor STEP 90 initiates the monitoring of the difference values outputted by A/D converter 44. In define STEP 91, logic 42 sets the stored value of the target level to be equal to reference level L1, which FIG. 7 shows to be within the range of commercial C1. Upon receiving pre-roll trigger, in trigger STEP 81, logic 42 performs store STEP 82, trigger STEP 83 and calculate STEP 84 to find the average difference D at the output of A/D converter 44 over time period t2-t3 (or other time period as described above). Logic 42 uses this average difference D, which represents the difference between the target level (equal to reference level L1) and the audio level of the last portion of program segment P1, as an audio level error signal for adjusting program attenuators 65 and 66. FIG. 7 shows the original position of program segment P2' being shifted to the new position of program segment P2 as a result of these adjustments.

After adjusting program attenuators 65 and 66, in adjust STEP 87, logic 42 exits the NO path of decision STEP 88 and proceeds to set STEP 89. At this point, logic 42 stores in memory 43 the output of A/D converter 44 as audio level error En, which at this point in the present example equals error E1. Logic 42 adjusts, in adjust STEP 92, commercial attenuators 55 and 56 using audio level error E1. Because it was assumed that commercial C1 was recorded substantially at the nominal advertisement recording reference level L1, audio level error E1 equals zero, making attenuator adjustments at this point unnecessary. In the absence of receiving a return trigger, in trigger STEP 93, logic 42 follows the NO path to trigger STEP 95 via index STEP 94 where index n is incremented. Upon receiving the next-commercial trigger from controller 46, in trigger STEP 95, logic 42 stores in memory 43 audio level error E(n+1) as being equal to the current output of A/D converter 44. At this point in the present example, logic 42 stores audio level error E2 as the difference between the audio level at the start of commercial C2 and the target level, i.e., reference level L1. As such, adjust STEP 92 performs an adjustment to advertisement attenuators 55 and 56 so that commercial C2 will play at or near reference level L1. This process is repeated for succeeding commercials.

When logic 42 receives a return trigger from controller 46, at time t4 in decision STEP 93, it returns the process to trigger STEP 81 to await reception of the next pre-roll trigger at, for example, time t5. This sequence takes place via the YES path of decision STEP 93. When controller 46 transmits the next pre-roll trigger at time t5, logic 42 proceeds through STEPS 81–84, thereby obtaining a new average difference D for the final portion of program segment P2 over time period t5-t6. FIG. 7 shows the new average difference D, over period t5-t6, to be significantly smaller than the difference D' that would have occurred absent the prior adjustments made to program attenuators 65 and 66 in adjust STEP 87 at time t3.

The level adjusting procedures so far described measure the average level of the program segment over a short time period at the end of the segment, e.g., between the pre-roll and transfer cues. In the FIG. 7 scenario, this procedure results in program segment P1 running at a level much lower than target level L1. It is also noted that in the embodiments so far described, logic 42 adjusts the attenuators, e.g., attenuators 55–57 and/or 65–67, within a relatively short time period that would normally go undetected by the viewer. For example, after the average level of program segment P1 in FIG. 7 is detected over time period t2-t3, the level of commercial C1 is adjusted (if necessary) within a short period that should go undetected by the listening or viewing audience. However, these functions can be modified in some situations by measuring the average program levels over one or more other time periods as the program segment runs while making small periodic attenuator adjustments to gradually bring the program or commercial level into line with the target level. Using this modified procedure with the FIG. 7 scenario, the first program segment P1 can be gradually brought into line with target level L1 well before receiving the pre-roll cue at time t3. The application of this steady level adjustment process will be described below in greater detail with respect to the embodiment of FIGS. 9 and 10.

It has been noted above that the teachings of this invention apply equally well to other types of signals, including video, data, control, etc. Video levels are usually easier to control than are audio levels because a well defined relationship exists between the desired picture information and its sync signal level. Because the sync signal level is normally consistent from one program segment to all others, it may be easily used to set video level. However, a few cases exist in which it is desirable to automatically set the level of the video signal other than using the sync signals. One important instance occurs when different video sources are being switched to a common output channel, or when video system gain changes over time.

Therefore, if level control attenuators are placed in the output of an advertisement video source, such as in lines 27 of FIGS. 3 and 6, they can be used to match the video level of a commercial to that of the program video source. A detector would detect the level of the video by measuring sync tip amplitude. It is known to those skilled in the art how to measure sync amplitude. In addition, if a second set of level control attenuators are placed in the program video source output, such as in lines 22 of FIGS. 3 and 6, they could be used to correct for incorrect video level coming from that program video source.

Figure 9:
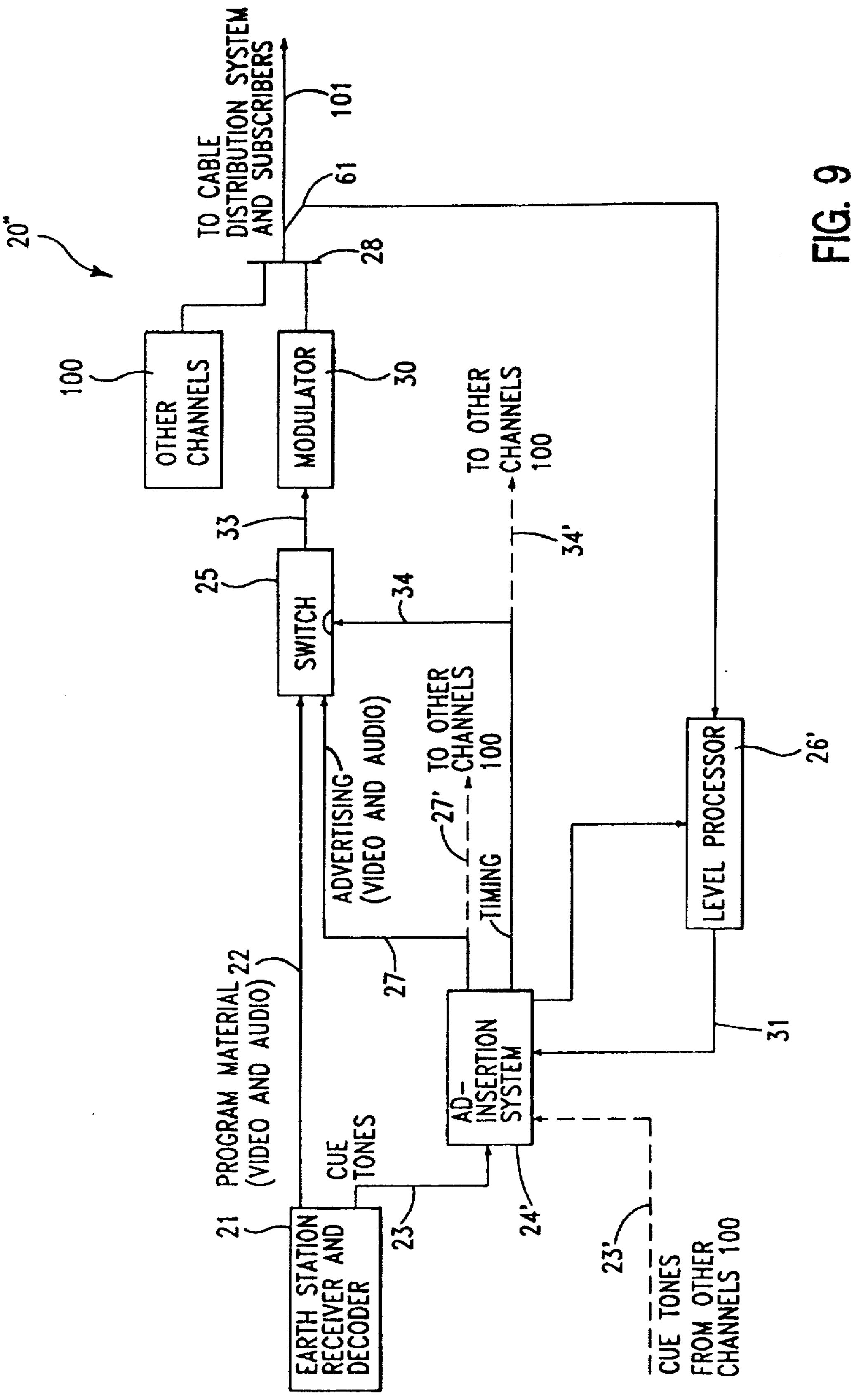
FIG. 9 is a system block diagram, similar to that of FIG. 1, of a cable television system constructed in accordance with another alternate embodiment of the invention.
Figure 10:
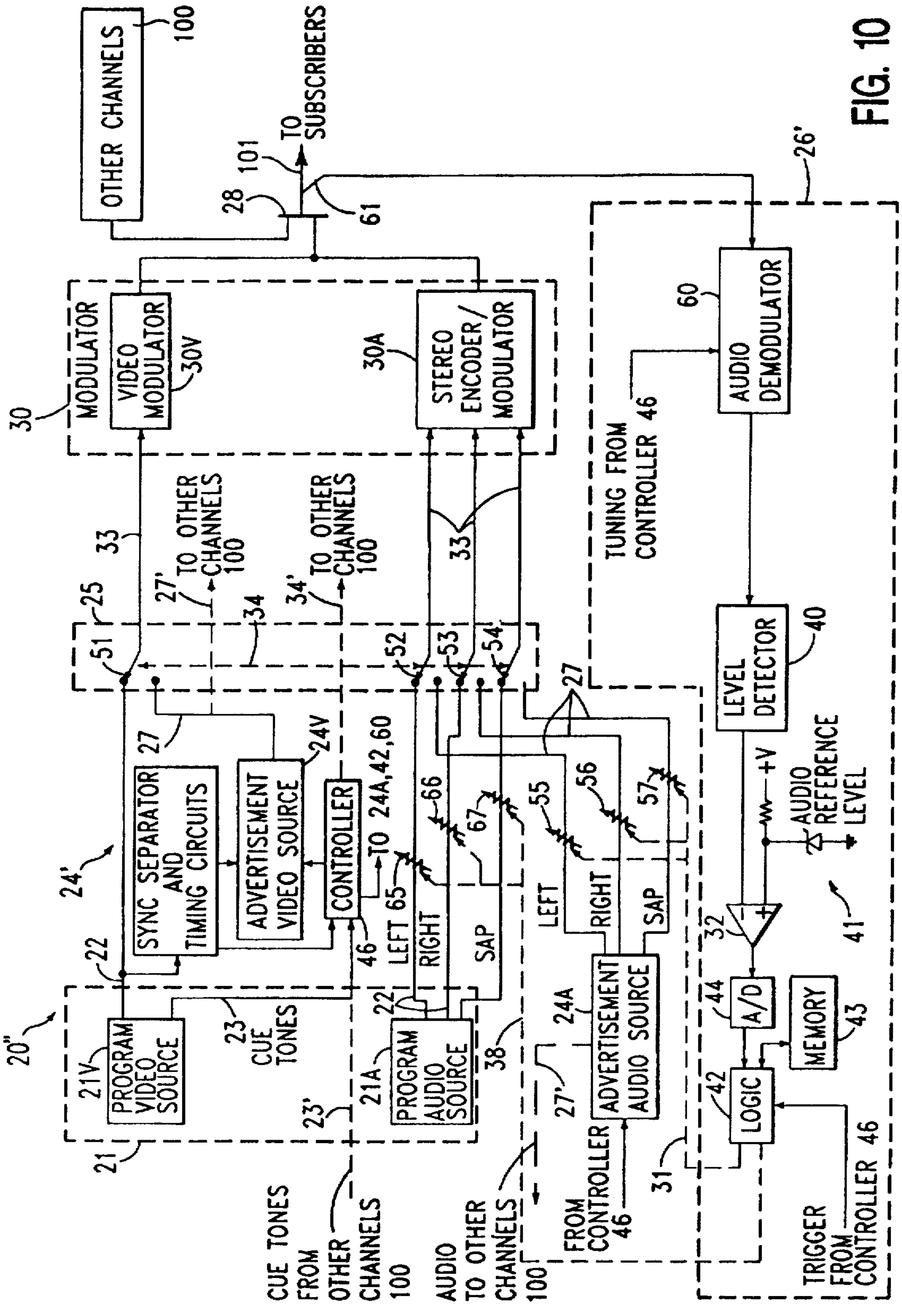
FIG. 10 is a detailed block diagram, similar to that of FIG. 6, of the alternate embodiment of the invention shown in FIG. 9.

FIGS. 9 and 10 show yet another embodiment. Here CTV system 20" corrects audio-level differences that may be introduced by audio-level adjustments contained in conventional modulator equipment. A control device on a conventional modulator, e.g., modulator 30, is frequently labeled "DEVIATION," because it controls the deviation of the sound carrier: the greater the audio level the greater the deviation. If the operators set the modulator deviations inconsistently from one channel to the next, the associated audio levels will change when subscribers are tuning channels. Thus, controlling the deviation (sound level) between channels of a multi-channel CTV system 20", as depicted in FIGS. 9 and 10, creates further normalization problems.

The normalization technique of CTV system 201" parallels that of CTV system 20' of FIG. 6, with a notable exception that level detector 40 derives its audio input signals form different points. CTV system 20' derives its audio level information from the individual subscriber channels, viz., lines 33. On the other hand, CTV system 20" derives its audio level information from a point common to all subscriber channels. More specifically, while CTV system 20' uses the left and right audio channels outputted by receiver 21 and ad-insertion system 24 via adder 39, system 20" derives the audio from the main subscriber lines 101.

Level processor circuit 26' of system 20", employs tuneable demodulator 60 to selectably monitor the audio outputs of the various subscriber channels. The audio input of demodulator 60 connects to the main subscriber lines 101 via directional coupler 61. When monitoring a particular channel, demodulator 60 tunes to the output of the appropriate channel modulator, e.g., modulator 30A or an equivalent audio modulator (not shown) in one of the other channels 100. A preferable implementation of demodulator 60 includes a conventional agile television demodulator with a calibrated audio output and a tuner suitable for control by controller 46. In the television system used in North America (NTSC), the audio on main subscriber lines 101 deviates the audio carrier by 25 kilohertz (KHz). In this regard, demodulator 60 is preferably calibrated such that its output voltage equals a known value for this 25 KHz deviation. As such, this known value corresponds to audio reference level L1. Because demodulator 60 produces a monaural sum signal, level processor circuit 26' does not include an adder similar to adder 39 of systems 20 and 20'.

For CTV system 20", the cue tones received by commercial insertion controller 46 transmit on line 23 from program video source 21V and on lines 23' from similar equipment (not shown) in the other channels 100. In addition to timing information, these cue tones include channel tuning information which insertion controller 46 uses to direct the ad-insertion process of ad-insertion system 24'. In this regard, ad-insertion system 24' is a conventional system having multiple channels for simultaneously inserting commercials in more than one subscriber channel via lines 27 and 27'. Additionally, insertion controller 46 uses the channel tuning information to automatically tune audio demodulator 60 from one subscriber channel to another. When a program segment, e.g., program segment P1 of FIG. 2, nears its end on any channel, commercial insertion controller 46 tunes audio demodulator 60 to that channel for performance of its appropriate normalization process.

The audio level normalization control loop for each channel in CTV system 20" includes attenuators 55–57 and 65–67, and stereo encoder and audio modulator 30A. These items will be unique to each channel. This normalization control loop also includes level processor circuit 26' which comprises demodulator 60, level detector 40, amplifier 32, A/D converter 44 and logic 42. These items are shared by all of the channels. Level processor circuit 26' normalizes the program audio from all channels, including other channels 100, and commercial audio being routed through all channels from ad-insertion system 24'. As such, CTV system 20" offers a closed-loop control of audio level that includes normalization of mismatched levels due to several sources including the audio modulators.

Having the elements of tuner processor circuit 26" common to all channels both minimizes cost and promotes more consistency from one channel to another. The use of common equipment does, however, preclude the measurement of the audio level just before a commercial on a plurality of channels. Consequently, a queuing routine must be used for defining priority channels as the insertion process proceeds. The present invention contemplates that insertion controller 46 be programmed to define and select priority channels to which audio demodulator 60 is tuned just prior to a commercial. As mentioned above, conventional insertion controllers know the time that commercials will play within a minute or two in most cases. As such, some channels can be monitored between commercials and their audio deviation optimized for average audio over a period other than the short period just before the commercial (e.g., other than time period t2-t3). In practice, this solution will produce sufficient normalization in most cases because audio levels do not change particularly fast.

Further, when commercials begin simultaneously on several subscriber channels (a common occurrence), insertion controller 46 selects these channels sequentially according to pre-defined priority routines. Although insertion controller 46 may assign tuning priorities for audio demodulator 60 according to any number of queuing routines, including a random assignment routine, a preferred priority routine for making priority assignments is as follows: the channels to be given the highest priority are chosen from a random selection of the channels whose level offsets are unknown (i.e., they have never been measured and stored); followed by an ordered selection of the remaining channels based on the length of time that its commercial has last played, with those having the longer periods given the higher priority. Using this priority routine, commercials that have not yet played and, therefore, have not yet been normalized are given top priority. Because there is more opportunity for equipment level settings to drift over time, priorities are next assigned based on the length of time since the commercial last played; the one with the longest time period of non-play assigned the top priority. When there is a conflict in priorities, the routine makes random assignments from those involved in the conflict.

Quality control functions are possible for systems of the type shown in FIGS. 9 and 10. It is known by viewers of cable television that the audio level from one channel to another is not always consistent. This is usually caused by head-end set-up errors. The set-up errors are, in turn, caused by excessive work load or insufficient training of personnel, or by limitations in equipment. By sequentially monitoring the level on all channels, the audio level of all channels can be made the same, solving a long-standing complaint against conventional cable systems.

Another quality control function is contemplated using the standard pilot level on stereo channels. It is generally known that the pilot level on stereo channels is not automatically set correctly. After a stereo encoder generates such pilot levels, they are modulated onto the audio carrier. In some equipment, the adjustment of the pilot level is a factory calibration, and in other equipment is a field adjustment. It is possible to add to level processor 26', for example, a channel tuned to the standard 15.734 KHz pilot frequency. The level of the pilot could then be measured. Due to the way equipment is normally built, it will not be readily possible to automatically correct the pilot level, but a visual or audible indicator could notify an operator of a problem.

As suggested above, those skilled in the art are aware that measuring audio level is extremely difficult, in part by virtue of the fact that normal programming includes constantly varying audio levels, possibly covering a very large dynamic range. For example, a program may include a loud argument between two individuals, followed by an almost silent scene when one of them runs out of the house and through woods. It is desirable in a case such as this, to set the deviation during the argument, letting the audio level during the running scene fall where the director's artistic judgment placed it. Adjusting to a louder signal (higher deviation) during the running scene, is not appropriate. An algorithm for gradually adjusting audio level (and for determining the match level of a commercial) is programmed into the software of logic 42 and controller 46. Although various algorithms are possible, one that experience teaches may be most appropriate with respect to system 20" of FIGS. 9 and 10 will now be described.

During program content, loudness is periodically monitored over several periods and attenuators 65 and 66 are adjusted while a program segment runs. A one minute (for example) timer in logic 42 starts each time level detector 40 indicates that the audio level has reached reference level L1. If the audio level reaches reference level L1 more than, for example, five times during a minute, the level is turned down by increasing the attenuation of attenuators 65 and 66. The adjustment is done in a minimum control increment so as not to be audible to the listener. For example, an increment of 0.5 dB is suitable. On the other hand, if the audio does not reach the maximum level at all during the minute, the volume is increased by adjusting attenuators 65 and 66. The volume is increased by the same minimum amount, which is not detectable by the listener. If another minute elapses without the audio level reaching the reference level L1, logic 42 adjusts attenuators 65 and 66 so that the audio level is again increased by that minimum amount. Such an algorithm will result in the volume level ultimately being set to reference level L1 as close as possible.

Another algorithm would monitor the level with respect to reference level L1, and any time the audio level reaches reference level L1, logic 42 adjusts attenuators 65 and 66 so that the audio level is reduced almost instantaneously until it drops below reference level L1. If reference level L1 is not reached again for some length of time, such as one minute, logic 42 adjusts attenuators 65 and 66 so that the audio level increases by the same small increment as above. The increase is repeated at intervals of a minute or so, until reference level L1 is again reached. This type of algorithm forms a fast attack, slow decay volume control strategy, which is often preferred for volume control downstream of where the artistic qualities of the program are set. In general this is the type of algorithm that is favored in this circumstance.

In certain circumstances the artistic qualities may be changed by bringing the volume up more rapidly if it does not reach reference level L1. This changes the control strategy to what is often called "compression." It is generally not preferred unless typical listening conditions are different from those anticipated during creation of the program.

Figure 11:
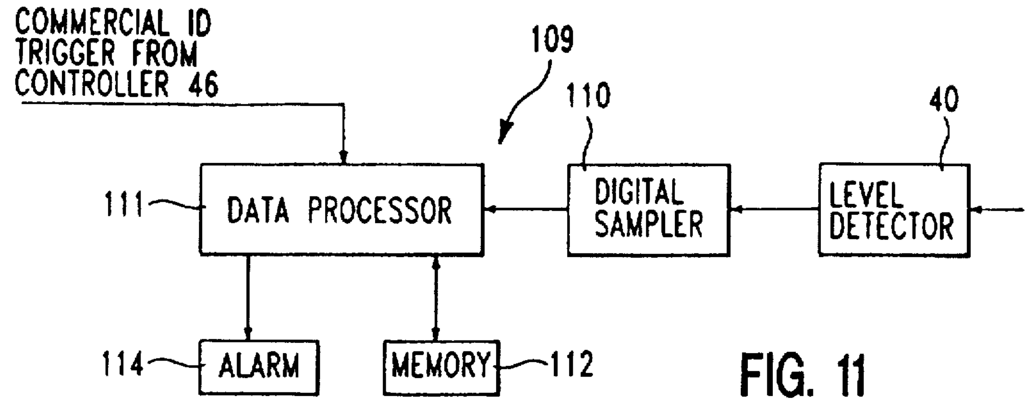
FIG. 11 is a detailed block diagram of a commercial verification system in accordance with the present invention.
Figure 12:
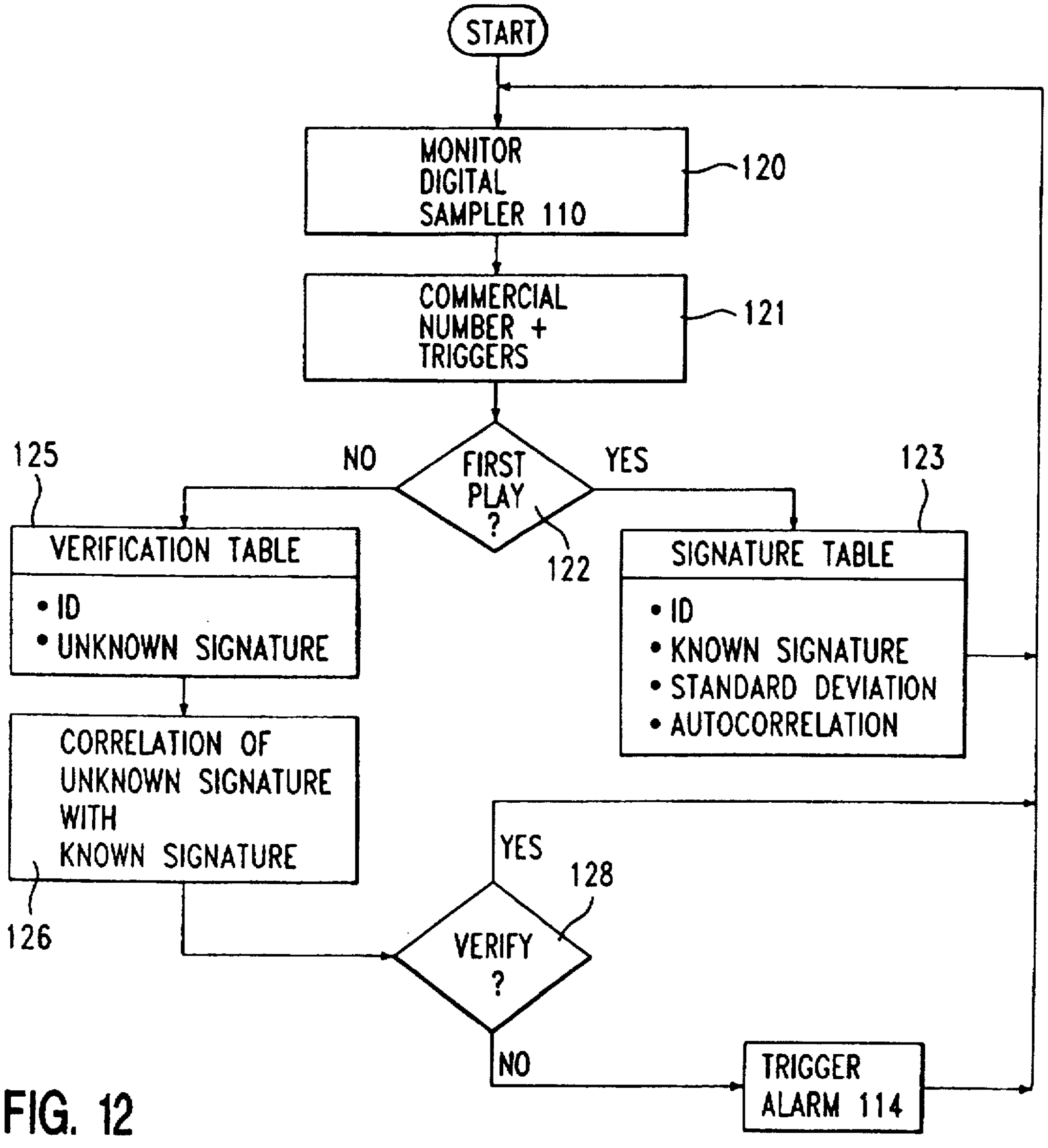
FIG. 12 is a flow chart illustrating process steps performed by the system of FIG. 11.

Each audio transmission, be it part of a commercial or an entertainment program, has a characteristic audio-level signature that may be derived from level detector 40. FIGS. 11 and 12 illustrate a verification system that uses such audio-level signatures to automatically determine if the content of the transmission corresponds to the content that was intended. This function is of particular importance in advertising where it is desirable to verify that a particular commercial was transmitted at the proper time on the proper channel.

Referring now to FIGS. 11 and 12, verification system 109 includes digital sampler 110 which outputs a unique series of audio level samples over predefined time periods for each commercial. Digital processor 111 receives these samples from sampler 110 while receiving commercial ID data and trigger pulses from insertion controller 46 in monitor STEP 120 and data STEPS 121. Processor 111 also connects to memory 112, correlation detector 113 and alarm 114. Generally, processor 111 stores the signatures for all commercials that are to be played in a signature table in memory 112, via the YES path of decision STEP 122 and store STEP 123. These signatures are stored, along with their commercial ID data, the first time that each commercial is played by the CTV system, or, alternatively, they may be imported to memory 112 from data obtained when the commercials are recorded. Processor 111 performs corresponding auto correlations on each of the signatures and stores the auto correlation results in the signature table. Still further, for each commercial, processor 111 finds the standard deviation for the set of samples that make up its signature. These standard deviation values, which are measures of the extent that the set of samples of each signature deviates from its mean, are also calculated and stored in the signature table during store STEP 123.

Later, when a particular commercial plays, processor 111 stores, in store STEP 125, its commercial ID data and signature in a verification table to be used for verification. To verify that a particular commercial that was played, say commercial CX, was the desired commercial, say commercial C1, processor 111 retrieves the CX signature of the unknown commercial from the verification table. Processor 111 performs, in calculate STEP 126, a correlation of the unknown signature CX with the known signature C1. Processor 111 then compares, in decision STEP 128, the autocorrelation C1/C1with the correlation C1/CX and the standard deviation of commercial C1. If the autocorrelation C1/C1and correlation C1/CX are of comparable value and high as compared to the standard deviation of commercial C1, then there is a strong likelihood that commercial CX corresponds to commercial C1. However, if the autocorrelation C1/C1is high compared with the standard deviation of commercial C1 while correlation C1/CX is low compared with the standard deviation of commercial C1, processor 111 fails to verify commercial CX and activates alarm 114. Of course, the autocorrelation results of the stored signatures need not be stored in signature table, but instead calculation STEP 126 may include the process of obtaining both the desired autocorrelation C1/C1and the apparent cross-correlation C1/CX before obtaining verification via verify STEP 128.

To maximize system performance, it is contemplated further that level detector 40 preferably measure the subjective loudness of the audio. This contrasts with other measuring options, such as measuring peak audio levels. In the instant invention level detector 40 preferably obtains a metric of the audio level that correlates well with the way humans subjectively perceive the loudness of audio program material.

Measuring the subjective loudness of an audio signal is a difficult undertaking. One of the earlier known standards for doing this is the volume unit (VU) meter developed cooperatively by the telephone and broadcast industries in 1939, and still in use today. The VU meter standard was developed based on the capabilities of the D'Arsonval meter movements available at that time. That the standard remains in use today is more of a testament to the difficulty of measuring subjective loudness, than it is to the validity of the standard as a measure of loudness. Those skilled in these arts normally use this standard only for general guidance while imposing their own subjective judgment as to how loud a signal sounds.

The European Broadcast Union (EBU) has for some years used a peak reading meter to measure the loudness of a signal. Some authorities propose that the EBU method is superior to using a VU meter because it relates nicely to the needs of engineers monitoring the peak level of a signal for transmission purposes. However, researchers have sought better methods for measuring an audio signal that correlate with subjective loudness. FIG. 13 shows a schematic of a preferred circuit suitable for use as level detector 40 for measuring subjective loudness of an audio signal.

Figure 14:
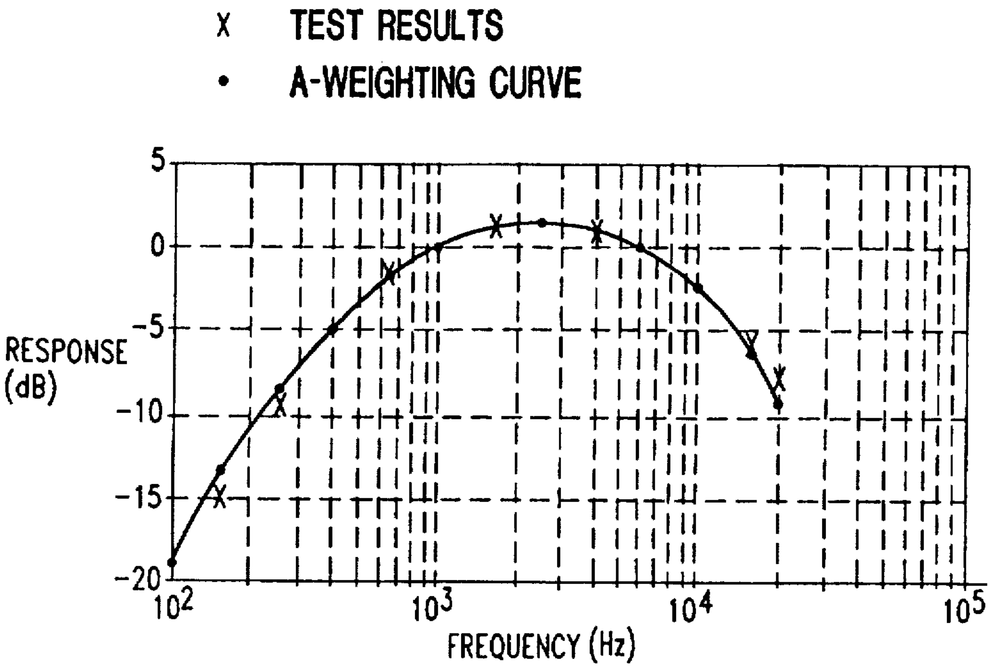
FIG. 14 is a graph showing a plot of response in decibels (dB) vs. frequency for comparing test results for the circuit of FIG. 13 with a conventional A-weighting curve which closely resembles the frequency response of a typical human ear.

Level detector 40 is a particularly critical circuit, in that it must produce a voltage that varies proportionally to the subjective loudness heard by a typical listener. Level detector 40, as depicted in FIG. 13, combines a close approximation of a standard A-weighting curve, such as shown in FIG. 14, with a factor reflecting the observation that fast, transitory sound is not perceived as loudly as would be the same sound if it lasted longer. These concepts are discussed in the following publications: Benson, *Audio Engineering Handbook*, 1988, pp 1–38 to 1–39; and Burden, et al., "A Different Approach to the Old Problem of Audio Level Monitoring," 84th Convention of the Audio Engineering Society, March 1–4, Paris, 1988, pp 1 to 8.

The A-weighting curve plots response vs. frequency such that its values closely resemble the typical response of the human ear. Filtering circuits having a response that approximates the A-weighting curve have been used in audio level measurements as a means of pre-filtering a signal such that subsequent detection of volume level will be roughly equal to the frequency response exhibited by the human ear. Further, it is known that humans generally perceive loudness partially as a function of duration of the sound, with transitory signals sounding progressively louder until the duration exceeds about 200 micro-seconds. Beyond this period, the perceived loudness no longer varies as a function of duration.

FIG. 13 depicts the specific circuit elements for an implementation of level detector 40 that was tested and compared to an A-weighting curve as shown in FIG. 14. The circuit schematic of FIG. 13 places parameter values for the various elements adjacent the element symbols. In FIG. 13, capacitance values are given in microfarads and resistance values are in ohms. The reference markings adjacent diodes D1–D4 and amplifiers U1A, U1B, U1C, U1D and U2A are conventional identifications of these elements. Transistor Q1 is a conventional NPN transistor.

The audio signal monitored by level detector 40 appears at input terminal 140. Amplifier U1A and the associated elements constitute an active band-pass filter 141. Generally, filter 141 is a conventional circuit with the addition of capacitor C3 which creates a portion of the rolloff required by the A-weighting curve. From filter 141, the signal passes to low-pass filter 142 comprising amplifier U1B and the associated components. Again, this circuit is known to those skilled in the art. High-pass filter 143, comprising capacitor C5 and resistor R8, provides a portion of the rolloff at low frequencies required by the response of the A-weighting curve.

The output of high-pass filter 143 passes to full wave rectifier 144, consisting of amplifiers U1C and U1D and their associated components. Again, this circuit is familiar to those skilled in the art. The output at pin 8 of U1C is a full wave rectified representation of the audio signal at input terminal 140 after it has passed through filters 141–143. The R-C circuit, formed by resistor R16 and capacitor C6, limits the attack time of the circuit to limit the effect on the audio level of a momentary high level sound. The time constant of the R-C circuit is much shorter than the maximum duration proposed by the Benson publication cited above. This is done to allow a certain degree of fast attack characteristic to pass to the measuring facility.

Finally, dB circuit 145, comprising amplifier U2A and associated components, converts the output of rectifier 144 to decibel or logarithmic representation. This circuit is also known to those skilled in the art. Output terminal 146 passes the signal to comparison amplifier 32. FIG. 14 shows the A-weighting curve as a solid line and the test values of the filter response of level detector 40 as X's. As can be seen from inspection, there is a close correlation between the responses of the A-weighting curve and the test results of the FIG. 13 implementation of level detector 40.

It is to be understood, therefore, that within the scope of the appended claims, the invention may be practiced otherwise than as specifically described.

What is claimed is:

1. A signal processing system having a normalized output signal comprising:

a first signal source;

a second signal source;

a signal combining means connected to said first and second signal sources for forming an output signal by linking signal segments derived from said first and second signal sources into a series of said signal segments;

a level processor means connected to said signal combining means for determining a level of intensity of said output signal, wherein said level processor means generates a target level and an error level related to the difference between said target level and said level of intensity of said output signal and, wherein said level processor means includes level storage means for storing said error level and the corresponding source of said signal segment; and a level adjusting means connected to at least one of said signal sources and responsive to said level processor means for adjusting a level of intensity of said signal segments from said at least one of said signal sources such that said level of intensity of said output signal is normalized, wherein said level adjusting means adjusts said level of intensity of said signal segments as a function of said error level, and further wherein said level adjusting means adjusts said level of intensity of said signal segments as a function of corresponding ones of said error level stored in said level storage means.

2. The system of claim 1 wherein said target level is a function of said level of intensity of said output signal for signal segments derived from said first signal source.

3. The system of claim 1 wherein said level processor means includes a reference level means for generating said target level at a fixed predetermined value.

4. A signal processing system having a normalized output signal comprising:

a first signal source;

a second signal source;

a signal combining means connected to said first and second signal sources for forming an output signal by linking signal segments derived from said first and second signal sources into a series of said signal segments;

a level processor means connected to said signal combining means for determining a level of intensity of said output signal, wherein said level processor means further includes a reference level means for generating a predetermined fixed reference level, and said level processor means determines an error level related to the difference between said level of intensity of said output signal and said fixed reference level; and a level adjusting means connected to at least one of said signal sources and responsive to said level processor means for adjusting a level of intensity of said signal segments from said at least one of said signal sources such that said level of intensity of said output signal is normalized and, said level adjusting means further connected to said first and second sources for adjusting said level of intensity of said signal segments at corresponding ones of said signal sources.

5. The system of claim 4 wherein said level processor means determines said level of intensity of said output signal for signal segments derived from said first signal source, and said level adjusting means adjusts said level of intensity of said signal segments at said second signal source as a function of said level of intensity of a preceding signal segment from said first signal source.

6. A signal processing system having a normalized output signal comprising:

a first signal source, wherein said first signal source includes cue means for marking borders of said signal segments;

a second signal source, said second signal source being responsive to said cue means for generating signal segments and for causing said signal combining means to link said signal segments at said borders;

a signal combining means connected to said first and second signal sources for forming an output signal by linking signal segments derived from said first and second signal sources into a series of said signal segments;

a level processor means connected to said signal combining means for determining a level of intensity of said output signal, wherein said level processor means generates a target level and an error level related to the difference between said target level and said level of intensity of said output signal; and a level adjusting means connected to at least one of said signal sources and responsive to said level processor means for adjusting a level of intensity of said signal segments from said at least one of said signal sources such that said level of intensity of said output signal is normalized, wherein said level adjusting means adjusts said level of intensity of said signal segments as a function of said error level.

7. The system of claim 6 wherein said level adjusting means adjusts said level of intensity of said signal segments at said borders of said signal segments.

8. The system of claim 6 wherein said first and second signal sources include audio signals and said level of intensity corresponds to the loudness of said audio signals.

9. A signal transmission system for producing a composite output signal formed by linking signals from a plurality of signal sources comprising:

a first signal source means for generating a series of first signal segments and cue tones indicating the borders of said first signal segments;

a second signal source means connected to said first signal source means and responsive to said cue tones for generating a series of second signal segments;

a signal combining means connected to said first and second signal source means for forming said composite output signal by alternately linking said first signal segments with said second signal segments;

a level processor means connected to said signal combining means for determining a level of intensity of said composite output signal; and a level adjusting means connected to at least one of said signal source means and responsive to said level processor means for adjusting a level of intensity of signal segments from said at least one of said signal source means such that said level of intensity of said output signal is normalized.

10. The system of claim 9 wherein said first signal segments and said second signal segments include audio signals and said level of intensity corresponds to the loudness of said audio signals.

11. The system of claim 10 wherein said level processor means determines the loudness of a portion of said first signal segments, and said level adjusting means adjusts the loudness of said second signal segments as a function of said loudness of said portion of said first signal segments.

12. The system of claim 11 wherein said level processor means generates a target loudness level and an error level related to the difference between said target loudness level and the loudness of said output signal, and said level adjusting means adjusts said loudness of said output signal as a function of said error level.

13. The system of claim 12 wherein said target loudness level is a function of said loudness of portions of said first signal segments.

14. The system of claim 12 wherein said level processor means includes a reference level means for generating said target level at a fixed predetermined value.

15. The system of claim 12 wherein said level processor means includes level storage means for storing said error levels, and said level adjusting means adjusts the loudness of said signal segments as a function of corresponding ones of said error levels stored in said level storage means.

16. The system of claim 12 wherein said level adjusting means is connected to said first and second source means for adjusting said loudness of said first signal segments and said second signal segments.

17. The system of claim 12 wherein said first signal source means includes cue means for marking borders of said first signal segments, and said second signal source means being responsive to said cue means for generating said second signal segments and for causing said signal combining means to link at least one of said second signal segments to said first signal segments at said borders.

18. The system of claim 17 wherein said composite output signal includes a plurality of said second signal segments linked between successive ones of said first signal segments, said level processor means determines the loudness of each of said plurality of said second signal segments, and said level adjusting means adjusts said loudness for each of said plurality of said second signal segments.

19. The system of claim 18 wherein said level processor means includes signal signature means for storing predetermined loudness signatures for said signal segments, and for correlating a plurality of samples of said loudness for one of said signal segments with a corresponding one of said signatures to verify the transmission of said one of said signal segments.

20. The system of claim 19 wherein said level processor means includes loudness detector means having a frequency response that substantially resembles the typical response of a human ear.

21. A signal transmission system for transmitting an output signal comprising:

a plurality of signal channels, each said channel comprising:

a first signal source means for generating a series of first signal segments and cue tones indicating the borders of said first signal segments;

a second signal source means connected to said first signal source means and responsive to said cue tones for generating a series of second signal segments;

a first signal combining means connected to said first and second signal source means for forming a channel output formed by alternately linking said first signal segments with said second signal segments;

a second signal combining means connected to each of said first signal combining means for combining said channel outputs for simultaneous transmission;

a level processor means connected to said second signal combining means for determining a level of intensity of signals in one of said channel outputs; and a level adjusting means connected to at least one of said signal source means in each said channel and responsive to said level processor means for adjusting a level of intensity of said signal segments from said at least one of said signal source means in one of said channels such that said level of intensity of said channel output is normalized.

22. The system of claim 21 wherein each said first signal combining means includes a modulator means for modulating said channel output onto a carrier signal, and said level processor means includes a tunable loudness detector means for selectively detecting loudness for each of said channel outputs.

23. The system of claim 22 wherein said level processor means determines said level of intensity of said signal segments of one of said channel outputs, and said level adjusting means adjusts said level of intensity of said signal segments for the other of said channel outputs as a function of said level of intensity of said one of said channel outputs.

24. A signal processing method for producing a normalized output signal comprising:

generating a first signal from a first signal source;

generating a second signal from a second signal source;

combining said first and second signals to form an output signal by linking signal segments from said first and second signals into a series of signal segments;

determining a level of intensity of said output signal including determining said level of intensity of said output signal for signal segments derived from said first signal and generating a target level and an error level related to the difference between said target level and said level of intensity of said output signal; and adjusting a level of intensity of said signal segments to produce said normalized output signal including adjusting said level of intensity of signal segments from said second signal as a function of said level of intensity of a preceding signal segment from said first signal, and further including adjusting said level of intensity of said signal segments as a function of said error level.

25. The method of claim 24 wherein said determining step includes generating said target level as a function of said level of intensity of said output signal for signal segments derived from said first signal.

26. The method of claim 24 further including storing said error levels and the corresponding source of said signal segments, and wherein said adjusting step includes adjusting said level of intensity of said signal segments as a function of said error levels stored in said storing step.

27. A signal processing method for producing a normalized output signal comprising:

generating a first signal from a first signal source;

generating a second signal from a second signal source;

combining said first and second signals to form an output signal by linking signal segments from said first and second signals into a series of signal segments;

determining a level of intensity of said output signal, wherein said determining step includes generating a predetermined fixed reference level, and determining an error level related to the difference between said level of intensity of said output signal and said fixed reference level; and adjusting a level of intensity of said signal segments to produce said normalized output signal, said adjusting step including adjusting said level of intensity of said signal segments for corresponding ones of said first and second signals.

28. A signal processing method for producing a normalized output signal comprising:

generating a first signal from a first signal source, wherein said step of generating a first signal includes generating cue tones for marking borders of said signal segments;

generating a second signal from a second signal source, wherein said step of generating a second signal includes generating signal segments responsive to said cue tones for combining said signal segments at said borders;

combining said first and second signals to form an output signal by linking signal segments from said first and second signals into a series of signal segments;

determining a level of intensity of said output signal; and adjusting a level of intensity of said signal segments to produce said normalized output signal.

29. A signal transmission method for producing a composite output signal by linking signals from a plurality of signal sources comprising:

generating a series of first signal segments and cue tones indicating the borders of said first signal segments;

generating a series of second signal segments in response to said cue tones;

forming said composite output signal by alternately linking said first signal segments with said second signal segments;

determining a level of intensity of said composite output signal; and adjusting a level of intensity of signal segments such that said level of intensity of said composite output signal is normalized.

30. The method of claim 29 wherein said steps of generating a series of first signal segments and generating a series of second signal segments includes generating audio signals, and said level of intensity corresponds to the loudness of said audio signals.

31. The method of claim 29 wherein said determining step includes determining the loudness for a portion of said first signal segments, and said adjusting step includes adjusting the loudness of said second signal segments as a function of said loudness of said portion of said first signal segments.

32. The method of claim 30 wherein said determining step includes generating a target loudness level and an error level related to the difference between said target loudness level and the loudness of said composite output signal, and said adjusting step includes adjusting said loudness of said output signal as a function of said error level.

33. The method of claim 32 further including storing said error levels, and wherein said adjusting step includes adjusting the loudness of said signal segments as a function of said error levels stored in said storing step.

34. The method of claim 29 wherein said adjusting step includes adjusting said loudness of said first signal and said second signal.

35. The method of claim 30 wherein said determining step includes storing predetermined loudness signatures for said signal segments, and correlating one a plurality of samples of said loudness for one of said signal segments with a corresponding one of said loudness signatures to verify the transmission of said one of said signal segments.

36. The system of claim 35 wherein said determining step includes detecting said loudness as a function of the frequency response of the typical response of a human ear.

37. A signal transmission method for transmitting an output signal comprising:

generating composite output signals in each of a plurality of signal channels comprising:

generating a series of first signal segments and cues indicating the borders of said first signal segments;

generating a series of second signal segments in response to said cues; and forming a channel output by alternately linking said first signal segments with said second signal segments at said borders in response to said cues;

combining said channel outputs for simultaneous transmission;

determining a level of intensity of signals in one of said channel outputs; and adjusting a level of intensity of each of said channel outputs as a function of said one of said channel outputs such that said levels of intensity of said channel outputs are normalized.

38. The system of claim 37 wherein said step of forming a channel output includes modulating said signal segments onto a carrier signal, and said determining step includes detecting and demodulating a preselected one of said channel outputs for selectively determining loudness for each of said channel outputs.

* * * * *